United States Patent
Takizawa et al.

(10) Patent No.: US 9,309,389 B2
(45) Date of Patent: *Apr. 12, 2016

(54) RUBBER COMPOSITION FOR USE IN TIRE TREADS

(75) Inventors: Yoichi Takizawa, Hiratsuka (JP); Naoki Kushida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/383,898

(22) PCT Filed: Mar. 8, 2012

(86) PCT No.: PCT/JP2012/055988
§ 371 (c)(1),
(2), (4) Date: May 5, 2015

(87) PCT Pub. No.: WO2013/132631
PCT Pub. Date: Sep. 12, 2013

(65) Prior Publication Data
US 2015/0259515 A1 Sep. 17, 2015

(30) Foreign Application Priority Data

Mar. 8, 2012 (JP) .................. 2012-521404

(51) Int. Cl.
C08L 9/06 (2006.01)
C08K 3/00 (2006.01)
C08K 3/04 (2006.01)
B60C 1/00 (2006.01)

(52) U.S. Cl.
CPC ................. C08L 9/06 (2013.01); B60C 1/0016 (2013.04); C08K 3/0033 (2013.01); C08K 3/04 (2013.01); *C08K 2003/045* (2013.01); *C08L 2205/025* (2013.01)

(58) Field of Classification Search
CPC ....... C08L 9/06; C08L 2205/025; C08K 5/45; C08K 3/04; C08K 3/0033; C08K 2003/045; B60C 1/00; B60C 1/0016

USPC ............................................ 524/82, 525, 575
See application file for complete search history.

(56) References Cited

FOREIGN PATENT DOCUMENTS

| JP | 2006056979 A | * | 3/2006 |
|---|---|---|---|
| JP | 2007-246625 | | 9/2007 |
| JP | 2010-235663 | | 10/2010 |
| JP | 2011-246640 | | 12/2011 |

OTHER PUBLICATIONS

JP 2006-056979 A (2006), machine translation, Japan Platform for Patent Information (J-Plat Pat).*
JP 2007-246625 A (2007), machine translation, Japan Platform for Patent Information (J-Plat Pat).*
JP 2010-235663 A (2010), machine translation, Japan Platform for Patent Information (J-Plat Pat).*
International Search Report dated Apr. 10, 2012, 2 pages, Japan.

* cited by examiner

*Primary Examiner* — Susannah Chung
*Assistant Examiner* — Josephine Chang
(74) *Attorney, Agent, or Firm* — Thorpe North & Western

(57) ABSTRACT

A rubber composition in which from 80 to 150 parts by weight of carbon black having a nitrogen adsorption specific surface area of from 200 to 400 m$^2$/g is compounded per 100 parts by weight of styrene-butadiene rubber including from 60% to 100% by weight of solution-polymerized styrene-butadiene rubber S-SBR1 and from 40% to 0% by weight of solution-polymerized styrene-butadiene rubber S-SBR2 to result in a total of 100% by weight, the styrene quantity of the S-SBR1 being from 30% to 38% by weight, the vinyl quantity of the S-SBR1 being from 60% to 80% by weight, the glass transition temperature of the S-SBR1 being from −20° C. to −5° C., the weight-average molecular weight of the S-SBR1 being from 1,000,000 to 1,800,000, the glass transition temperature of the S-SBR2 being not less than −30° C. and less than −20° C., and the weight-average molecular weight of the S-SBR2 being from 1,000,000 to 1,800,000.

20 Claims, No Drawings

RUBBER COMPOSITION FOR USE IN TIRE TREADS

TECHNICAL FIELD

The present technology relates to a rubber composition for use in tire treads, and particularly relates to a rubber composition for use in tire treads by which rubber hardness, elastic modulus and rubber strength in the high-temperature state can be enhanced to or beyond conventional levels while dry grip performance is maintained.

BACKGROUND

It is known that the grip performance of a pneumatic tire is greatly affected by tire temperature, and sufficient grip performance is not obtained in the low-temperature state. In particular, racing tires for running on circuits must have the characteristic that the rubber composition that constitutes the treads reaches the high-temperature state as quickly as possible after travel begins. Therefore, a large quantity of carbon black is compounded in rubber compositions for use in treads. However, rubber hardness, elastic modulus and rubber strength of rubber compositions in which a large quantity of carbon black is compounded will easily decrease in the high-temperature state. For this reason, if high-speed travel continues for a long duration, wear resistance decreases, wear resistance of the tread surface will be negatively affected, dry grip performance gradually decreases due to heat sag, and, depending on the case, a blowout may occur.

Japanese Unexamined Patent Application Publication No. 2007-246625 proposes suppressing the decrease in rigidity due to heat generated while traveling and improving dry grip performance and heat sag resistance by compounding carbon black of small particle size in styrene-butadiene rubber having a high glass transition temperature as a rubber composition for use in tire treads. However, the required performance of racing tires demanded by users has further increased, and a rubber composition for use in tire treads that has excellent dry grip performance, has further improved rubber hardness, elastic modulus and rubber strength in the high-temperature state, and can maintain excellent dry grip performance for a longer time is demanded.

SUMMARY

The present technology provides a rubber composition for use in tire treads by which rubber hardness, elastic modulus and rubber strength in the high-temperature state can be enhanced to or beyond conventional levels while dry grip performance is maintained.

The rubber composition for use in tire treads of the present technology is a rubber composition comprising from 80 to 150 parts by weight of carbon black having a nitrogen adsorption specific surface area of from 200 to 400 m²/g being compounded per 100 parts by weight of styrene-butadiene rubber including from 60% to 100% by weight of solution-polymerized styrene-butadiene rubber S-SBR1 and from 40% to 0% by weight of solution-polymerized styrene-butadiene rubber S-SBR2 so as to result in a total of 100% by weight, styrene quantity of the S-SBR1 being from 30% to 38% by weight, vinyl quantity of the S-SBR1 being from 60% to 80% by weight, glass transition temperature of the S-SBR1 being from −20° C. to −5° C., weight-average molecular weight of the S-SBR1 being from 1,000,000 to 1,800,000, glass transition temperature of the S-SBR2 being not less than −30° C. and less than −20° C., and weight-average molecular weight of the S-SBR2 being from 1,000,000 to 1,800,000.

The rubber composition for use in tire treads of the present technology can enhance rubber hardness, elastic modulus and rubber strength in the high-temperature state to or beyond conventional levels while maintaining dry grip performance for a longer time due to the fact that from 80 to 150 parts by weight of carbon black having a nitrogen adsorption specific surface area of from 200 to 400 m²/g is compounded per 100 parts by weight of styrene-butadiene rubber including from 60% to 100% by weight of solution-polymerized styrene-butadiene rubber S-SBR1, which has a styrene quantity of from 30% to 38% by weight, a vinyl quantity of from 60% to 80% by weight, a glass transition temperature of from −20° C. to −5° C., and a weight-average molecular weight of from 1,000,000 to 1,800,000, and from 40% to 0% by weight of solution-polymerized styrene-butadiene rubber S-SBR2, which has a glass transition temperature of not less than −30° C. and less than −20° C. and a weight-average molecular weight of from 1,000,000 to 1,800,000, so as to result in a total of 100% by weight.

In the rubber composition of the present technology, from 10 to 50 parts by weight of aromatic modified terpene resin is preferably compounded per 100 parts by weight of the styrene-butadiene rubber.

Furthermore, from 0.2 to 5 parts by weight of the cyclic polysulfide expressed by formula (I) below is preferably compounded per 100 parts by weight of the styrene-butadiene rubber. By compounding a cyclic polysulfide, grip performance can be maintained for a long time, abraded skin can be suppressed, and rubber hardness and rigidity can be increased, further improving wear resistance of the rubber composition.

Formula 1

(I)

(wherein R is a substituted or unsubstituted alkylene group having from 4 to 8 carbons, or a substituted or unsubstituted oxyalkylene group having from 4 to 8 carbons; x is a number averaging from 3 to 5; and n is an integer from 1 to 5)

In a pneumatic tire in which this rubber composition is used in the treads, rubber hardness, elastic modulus and rubber strength in the high-temperature state can be enhanced to or beyond conventional levels while excellent dry grip performance is maintained for a longer time.

DETAILED DESCRIPTION

In the rubber composition for use in tire treads of the present technology, the rubber component is styrene-butadiene rubber made up of a solution-polymerized styrene-butadiene rubber having a high molecular weight and high glass transition temperature (referred to as "S-SBR1" hereinafter), and a solution-polymerized styrene-butadiene rubber having a high molecular weight and a glass transition temperature lower than that of S-SBR1 (referred to as "S-SBR2" hereinafter). Specifically, the total of from 60% to 100% by weight of S-SBR1 and from 40% to 0% by weight of S-SBR2 constitutes 100% by weight of the styrene-butadiene rubber.

S-SBR1 is a styrene-butadiene rubber having a styrene quantity of from 30% to 38% by weight, a vinyl quantity of from 60% to 80% by weight, a glass transition temperature (referred to as "Tg" hereinafter) of from −20° C. to −5° C., and a weight-average molecular weight (referred to as "Mw" hereinafter) of from 1,000,000 to 1,800,000.

The styrene quantity of S-SBR1 is from 30% to 38% by weight, and is preferably from 32% to 37% by weight. If the styrene quantity of S-SBR1 is less than 30% by weight, rubber hardness, elastic modulus and rubber strength in the high-temperature state will decrease, and grip performance will also decrease. If the styrene quantity of S-SBR1 exceeds 38% by weight, wear resistance will be negatively affected. Note that the styrene quantity in S-SBR1 is measured using infrared emission spectroscopy (Hampton technique).

The vinyl quantity of S-SBR1 is from 60% to 80% by weight, and is preferably from 62% to 70% by weight. If the vinyl quantity of S-SBR1 is less than 60% by weight, grip performance will decrease. Also, if the vinyl quantity of S-SBR1 exceeds 80% by weight, it will become too hard and grip performance will decrease. Note that the vinyl quantity in S-SBR1 is measured using infrared emission spectroscopy (Hampton technique).

Tg of S-SBR1 is from −20° C. to −5° C., and is preferably from −18° C. to −7° C. If Tg of S-SBR1 is lower than −20° C., grip performance will decrease. If Tg of S-SBR1 is higher than −5° C., wear resistance will be negatively affected. Note that in this specification, the Tg of S-SBR1 and S-SBR2 is measured using a thermograph by differential scanning calorimetry (DSC) at a temperature elevation speed of 20° C./minute. The temperature at the midpoint of the transition region is set as the glass transition temperature thereof. Furthermore, when S-SBR1 and S-SBR2 are oil extended products, the glass transition temperature is that of S-SBR1 and S-SBR2 in a state where the oil extension component (the oil) is not included.

Mw of S-SBR1 is from 1,000,000 to 1,800,000, and is preferably from 1,200,000 to 1,600,000. If Mw of S-SBR1 is less than 1,000,000, rubber hardness, elastic modulus and rubber strength in the high-temperature state will decrease. If Mw exceeds 1,800,000, ease of processing of the rubber composition will be negatively affected. Note that in this specification, Mw of S-SBR1 and S-SBR2 is measured via gel permeation chromatography (GPC), in terms of standard polystyrene.

The content of S-SBR1 in 100% by weight of the styrene-butadiene rubber is from 60% to 100% by weight, and is preferably from 70% to 100% by weight. If the S-SBR1 content is less than 60% by weight, rubber hardness, elastic modulus and rubber strength in the high-temperature state will decrease, and grip performance will be negatively affected.

In the rubber composition of the present technology, S-SBR2 may be compounded as an optional component. S-SBR2 is a solution-polymerized styrene-butadiene rubber having Tg of not less than −30° C. and less than −20° C., and having Mw of from 1,000,000 to 1,800,000.

Tg of S-SBR2 is not less than −30° C. and less than −20° C., and is preferably from −28° C. to −22° C. If Tg of S-SBR2 is lower than −30° C., grip performance will decrease. If Tg of S-SBR2 is higher than −20° C., wear resistance will be negatively affected.

Mw of S-SBR2 is from 1,000,000 to 1,800,000, and is preferably from 1,100,000 to 1,500,000. If Mw of S-SBR2 is less than 1,000,000, rubber hardness, elastic modulus and rubber strength in the high-temperature state will decrease. If Mw exceeds 1,800,000, ease of processing of the rubber composition will be negatively affected.

The content of S-SBR2 in 100% by weight of the styrene-butadiene rubber is from 40% to 0% by weight, and is preferably from 30% to 0% by weight. If the S-SBR2 content exceeds 40% by weight, rubber hardness, elastic modulus and rubber strength in the high-temperature state will decrease, and grip performance will be negatively affected. S-SBR2 is an optional component, and the styrene-butadiene rubber may be comprised of S-SBR1 described above only.

The rubber composition for use in tire treads of the present technology contains from 80 to 150 parts by weight of carbon black having a nitrogen adsorption specific surface area of from 200 to 400 m$^2$/g per 100 parts by weight of the styrene-butadiene rubber.

For the carbon black used in the rubber composition of the present technology, the nitrogen adsorption specific surface area ($N_2SA$) is from 200 to 400 m$^2$/g, and is preferably from 250 to 390 m$^2$/g. If $N_2SA$ of the carbon black is less than 200 m$^2$/g, grip performance will decrease. If $N_2SA$ of the carbon black exceeds 400 m$^2$/g, wear resistance will be negatively affected. The $N_2SA$ of the carbon black is calculated in accordance with JIS K6217-2.

The compounded quantity of carbon black is from 80 to 150 parts by weight, and is preferably from 90 to 140 parts by weight, per 100 parts by weight of the styrene-butadiene rubber. If the compounded quantity of carbon black is less than 80 parts by weight, rubber hardness, elastic modulus and heat build-up in the high-temperature state will be negatively affected. Furthermore, if the compounded quantity of carbon black exceeds 150 parts by weight, wear resistance will be negatively affected.

The rubber composition for use in tire treads of the present technology may also include other fillers other than carbon black. Examples of such fillers other than carbon black include silica, clay, mica, talc, calcium carbonate, aluminum hydroxide, aluminum oxide, titanium oxide, and the like. Silica and clay are preferable.

In the rubber composition for use in tire treads of the present technology, grip performance is preferably improved by compounding an aromatic modified terpene resin. The compounded quantity of the aromatic modified terpene resin is preferably from 10 to 50 parts by weight, and is more preferably from 20 to 45 parts by weight, per 100 parts by weight of the styrene-butadiene rubber. If the compounded quantity of the aromatic modified terpene resin is less than 10 parts by weight, grip performance cannot be sufficiently enhanced. If the compounded quantity of aromatic modified terpene resin exceeds 50 parts by weight, tackiness of the rubber composition will increase, and ease of molding and handling will be negatively affected, such as by sticking to the molding roller.

The aromatic modified terpene resin is obtained by polymerizing a terpene and an aromatic compound. Examples of the terpene include α-pinene, β-pinene, dipentene, limonene, and the like. Examples of the aromatic compound include styrene, α-methylstyrene, vinyl toluene, indene, and the like. Among these, styrene modified terpene resins are preferable as the aromatic modified terpene resin.

The aromatic modified terpene resin preferably has a softening point of from 70° C. to 160° C., and more preferably from 85° C. to 150° C. If the softening point of the aromatic modified terpene resin is lower than 70° C., the effect of improving grip performance cannot be sufficiently obtained. If the softening point of the aromatic modified terpene resin exceeds 160° C., wear resistance tends to be negatively affected. Note that the softening point of the aromatic modified terpene resin is measured according to JIS K 6220-1 (ball and ring method).

The rubber composition for use in tire treads of the present technology can increase rubber hardness, elastic modulus and rubber strength in the high-temperature state and can improve wear resistance of the rubber composition because a cyclic polysulfide expressed by formula (I) below is preferably compounded. For this reason, a high level of grip performance when traveling at high speed can be maintained for a long time, and abraded skin can be suppressed.

Formula 2

(I)

wherein R is a substituted or unsubstituted alkylene group having from 4 to 8 carbons, or a substituted or unsubstituted oxyalkylene group having from 4 to 8 carbons; x is a number averaging from 3 to 5; and n is an integer from 1 to 5.

In the cyclic polysulfide of formula (I) above, R is an alkylene group or an oxyalkylene group, and the carbon number thereof is preferably from 4 to 8, and is more preferably from 4 to 7. Examples of substituents on the alkylene group and oxyalkylene group include a phenyl group, benzyl group, methyl group, epoxy group, isocyanate group, vinyl group, silyl group and the like. S is sulfur. x is a number preferably averaging from 3 to 5, and more preferably averaging from 3.5 to 4.5. n is preferably an integer from 1 to 5, and more preferably from 1 to 4. Such a polycyclic sulfide can be produced by ordinary methods, for example, the production method described in Japanese Unexamined Patent Application Publication No. 2007-92086.

In the present technology, the compounded quantity of the cyclic polysulfide per 100 parts of the diene rubber is from 0.2 to 5 parts by weight, and is preferably from 1 to 4 parts by weight. If the compounded quantity of the cyclic polysulfide is less than 0.2 parts by weight, the effect of maintaining grip performance at a high level for a long time and the effect of improving blowout resistance will not be obtained. Additionally, the decrease in wear resistance of the rubber composition cannot be sufficiently suppressed. Furthermore, if the compounded quantity of cyclic polysulfide exceeds 5 parts by weight, ease of processing will be negatively affected.

In the rubber composition for use in tire treads of the present technology, the cyclic polysulfide of the above formula (I) acts as a vulcanizing agent. The vulcanizing agent may be the cyclic polysulfide alone, or may be used together with other vulcanizing agents. As other vulcanizing agents, sulfur is preferred. The compounded quantity of sulfur per 100 parts of the diene rubber is from 0.1 to 1.5 parts by weight, and preferably from 0.5 to 4 parts by weight. When sulfur is compounded, the weight ratio of cyclic polysulfide to sulfur (cyclic polysulfide/sulfur) is preferably from 1/5 to 10/1, and is more preferably from 1/4 to 4/1. Due to the weight ratio of cyclic polysulfide/sulfur being within such a range, the effect of maintaining grip performance at a high level for a long time is obtained, blowout resistance is enhanced, and wear resistance is improved.

The rubber composition for use in tire treads may also include various compounding agents that are commonly used in rubber compositions for use in tire treads. Examples thereof include vulcanization or cross-linking agents, vulcanization accelerators, antiaging agents, plasticizers, processing aids, liquid polymers, thermosetting resins, and the like. These compounding agents can be kneaded by a common method to obtain a composition that can then be used for vulcanization or cross-linking. These compounding agents can be blended at conventional general amounts so long as the objects of the present technology are not hindered. The rubber composition for use in tire treads can be produced by mixing the above-mentioned components using a well-known rubber kneading machine such as a Banbury mixer, a kneader, an open roll, or the like.

The rubber composition for use in tire treads of the present technology can be advantageously used in pneumatic tires. In a pneumatic tire in which this rubber composition is used in the treads, rubber hardness, elastic modulus and rubber strength in the high-temperature state can be enhanced to or beyond conventional levels while excellent dry grip performance is maintained for a longer time.

The present technology is further described below by examples. However, the scope of the present technology is not limited to these examples.

EXAMPLES

Twenty types of rubber composition for use in tire treads were prepared according to the formulations shown in Tables 1 and 2 (Working Examples 1 to 9 and Comparative Examples 1 to 11). The components except for the sulfur, vulcanization accelerator and cyclic polysulfide were kneaded in a 1.8 L sealed mixer for five minutes at 160° C. Then, the mixtures were extruded as master batches, to which the sulfur, vulcanization accelerator and cyclic polysulfide were added. Thereafter, the master batches were kneaded on an open roll. Note that in Tables 1 to 3, the net compounded quantity of each rubber component is shown in parentheses for SBR that contains extension oil.

Vulcanized rubber samples were fabricated by pressure vulcanizing the obtained 20 types of rubber composition for use in tire treads in a mold having a predetermined shape for 20 minutes at 160° C. Then, the rubber hardness, 300% modulus and tensile fracture strength in the high-temperature state, and tan δ (20° C.) were measured according to the methods described below.

Rubber Hardness (100° C.)

In accordance with JIS K6253, a type A durometer was used to measure the rubber hardness of the obtained test pieces at a temperature of 100° C. The obtained results are shown on the "Rubber hardness (100° C.)" rows of Tables 1 and 2, with the index value of Comparative Example 1 being 100. Higher index values mean that rubber hardness is high and mechanical characteristics are excellent, and that steering stability and grip performance are excellent when the pneumatic tire travels at high speed for a long time.

Tensile Fracture Strength and 300% Modulus (100° C.)

JIS #3 dumbbell test pieces (thickness: 2 mm) were punched from the obtained test pieces in accordance with JIS K6251. The test was conducted at 100° C. at a pulling rate of 500 mm/minute, and tensile fracture strength and 300% modulus (300% deforming stress) were measured. The obtained results are shown on the "Fracture strength (100° C.)" and "300% Mod (100° C.)" rows of Tables 1 to 3, with the index values of Comparative Example 1 each being 100. Larger index values mean that tensile fracture strength and rigidity in the high-temperature state are high and mechanical characteristics are excellent, and that steering stability, grip performance and abrasion resistance are excellent when the pneumatic tire travels at high speed for a long time. Dry grip performance (tan δ at 20° C.)

The dry grip performance of the obtained vulcanized rubber samples was evaluated based on the loss tangent tan δ (20° C.), which is a known indicator of dry grip performance. The tan δ was measured using a viscoelasticity spectrometer (manufactured by Toyo Seiki Seisaku-sho, Ltd.) under the following conditions: 10% initial distortion, ±2% amplitude, 20 Hz frequency, and 20° C. temperature. The obtained results are shown on the "tan δ (20° C.)" rows of Tables 1 and 2, with the index value of Comparative Example 1 being 100. Higher index values of tan δ (20° C.) mean superior dry grip performance.

TABLE 1

|  |  | Comparative Example 1 | Comparative Example 2 | Comparative Example 3 | Comparative Example 4 |
|---|---|---|---|---|---|
| S-SBR1 | pbw |  |  |  |  |
| S-SBR2a | pbw |  |  |  |  |
| S-SBR3 | pbw | 137.5(100) |  |  |  |
| S-SBR4 | pbw |  | 137.5(100) |  |  |
| S-SBR2a (S-SBR5 placeholder) | pbw |  |  | 137.5(100) |  |
| S-SBR6 | pbw |  |  |  | 137.5(100) |
| Carbon black 1 | pbw | 120 | 120 | 120 | 120 |
| Carbon black 2 | pbw |  |  |  |  |
| Carbon black 3 | pbw |  |  |  |  |
| Terpene resin 1 | pbw |  |  |  |  |
| Terpene resin 2 | pbw |  |  |  |  |
| Oil | pbw | 80 | 80 | 80 | 80 |
| Stearic acid | pbw | 2.0 | 2.0 | 2.0 | 2.0 |
| Zinc oxide | pbw | 3.0 | 3.0 | 3.0 | 3.0 |
| Sulfur | pbw | 2.0 | 2.0 | 2.0 | 2.0 |
| Vulcanization accelerator | pbw | 3.0 | 3.0 | 3.0 | 3.0 |
| Rubber hardness (100° C.) | Index value | 100 | 95 | 98 | 98 |
| tan δ (20° C.) | Index value | 100 | 120 | 92 | 94 |
| 300% Mod (100° C.) | Index value | 100 | 90 | 95 | 96 |
| Fracture strength (100° C.) | Index value | 100 | 95 | 95 | 97 |

|  |  | Working Example 1 | Working Example 2 | Comparative Example 5 |
|---|---|---|---|---|
| S-SBR1 | pbw | 137.5(100) | 137.5(100) | 137.5(100) |
| S-SBR2a | pbw |  |  |  |
| S-SBR3 | pbw |  |  |  |
| S-SBR4 | pbw |  |  |  |
| S-SBR6 | pbw |  |  |  |
| Carbon black 1 | pbw | 120 |  |  |
| Carbon black 2 | pbw |  | 120 |  |
| Carbon black 3 | pbw |  |  | 120 |
| Terpene resin 1 | pbw |  |  |  |
| Terpene resin 2 | pbw |  |  |  |
| Oil | pbw | 80 | 80 | 80 |
| Stearic acid | pbw | 2.0 | 2.0 | 2.0 |
| Zinc oxide | pbw | 3.0 | 3.0 | 3.0 |
| Sulfur | pbw | 2.0 | 2.0 | 2.0 |
| Vulcanization accelerator | pbw | 3.0 | 3.0 | 3.0 |
| Rubber hardness (100° C.) | Index value | 102 | 102 | 90 |
| tan δ (20° C.) | Index value | 115 | 105 | 90 |
| 300% Mod (100° C.) | Index value | 120 | 130 | 140 |
| Fracture strength (100° C.) | Index value | 115 | 110 | 105 |

|  |  | Working Example 3 | Working Example 4 | Working Example 5 |
|---|---|---|---|---|
| S-SBR1 | pbw | 137.5(100) | 137.5(100) | 137.5(100) |
| S-SBR2a | pbw |  |  |  |
| S-SBR3 | pbw |  |  |  |
| S-SBR4 | pbw |  |  |  |
| S-SBR6 | pbw |  |  |  |
| Carbon black 1 | pbw | 120 | 120 | 120 |
| Carbon black 2 | pbw |  |  |  |
| Carbon black 3 | pbw |  |  |  |
| Terpene resin 1 | pbw | 20 | 60 |  |
| Terpene resin 2 | pbw |  |  | 20 |
| Oil | pbw | 60 | 20 | 60 |
| Stearic acid | pbw | 2.0 | 2.0 | 2.0 |
| Zinc oxide | pbw | 3.0 | 3.0 | 3.0 |
| Sulfur | pbw | 2.0 | 2.0 | 2.0 |

TABLE 1-continued

| | | | | |
|---|---|---|---|---|
| Vulcanization accelerator | pbw | 3.0 | 3.0 | 3.0 |
| Rubber hardness (100° C.) | Index value | 103 | 102 | 102 |
| tanδ (20° C.) | Index value | 125 | 145 | 117 |
| 300% Mod (100° C.) | Index value | 123 | 120 | 120 |
| Fracture strength (100° C.) | Index value | 115 | 105 | 118 |

TABLE 2

| | | Working Example 6 | Working Example 7 | Working Example 8 | Working Example 9 |
|---|---|---|---|---|---|
| S-SBR1 | pbw | 110(80) | 110(80) | 137.5(100) | 137.5(100) |
| S-SBR2a | pbw | 27.5(20) | | | |
| S-SBR2b | pbw | | 27.5(20) | | |
| S-SBR3 | pbw | | | | |
| S-SBR4 | pbw | | | | |
| S-SBR5 | pbw | | | | |
| Carbon black 1 | pbw | 120 | 120 | 120 | 120 |
| Terpene resin 1 | pbw | 20 | 20 | 20 | 20 |
| Oil | pbw | 60 | 60 | 60 | 60 |
| Cyclic polysulfide 1 | pbw | | | 4 | |
| Cyclic polysulfide 2 | pbw | | | | 4 |
| Stearic acid | pbw | 2.0 | 2.0 | 2.0 | 2.0 |
| Zinc oxide | pbw | 3.0 | 3.0 | 3.0 | 3.0 |
| Sulfur | pbw | 2.0 | 2.0 | 0.5 | 0.5 |
| Vulcanization accelerator | pbw | 3.0 | 3.0 | 3.0 | 3.0 |
| Rubber hardness (100° C.) | Index value | 110 | 112 | 106 | 106 |
| tanδ (20° C.) | Index value | 110 | 108 | 115 | 116 |
| 300% Mod (100° C.) | Index value | 125 | 118 | 125 | 126 |
| Fracture strength (100° C.) | Index value | 120 | 130 | 128 | 129 |

| | | Comparative Example 6 | Comparative Example 7 | Comparative Example 8 |
|---|---|---|---|---|
| S-SBR1 | pbw | 68.75(50) | 110(80) | 110(80) |
| S-SBR2a | pbw | 68.75(50) | | |
| S-SBR2b | pbw | | | |
| S-SBR3 | pbw | | | 27.5(20) |
| S-SBR4 | pbw | | | |
| S-SBR5 | pbw | | 20 | |
| Carbon black 1 | pbw | 120 | 120 | 120 |
| Terpene resin 1 | pbw | 20 | 20 | 20 |
| Oil | pbw | 60 | 67.5 | 60 |
| Cyclic polysulfide 1 | pbw | | | |
| Cyclic polysulfide 2 | pbw | | | |
| Stearic acid | pbw | 2.0 | 2.0 | 2.0 |
| Zinc oxide | pbw | 3.0 | 3.0 | 3.0 |
| Sulfur | pbw | 2.0 | 2.0 | 2.0 |
| Vulcanization accelerator | pbw | 3.0 | 3.0 | 3.0 |
| Rubber hardness (100° C.) | Index value | 115 | 95 | 104 |
| tanδ (20° C.) | Index value | 90 | 105 | 98 |
| 300% Mod (100° C.) | Index value | 130 | 95 | 98 |
| Fracture strength (100° C.) | Index value | 125 | 90 | 94 |

| | | Comparative Example 9 | Comparative Example 10 | Comparative Example 11 |
|---|---|---|---|---|
| S-SBR1 | pbw | 110(80) | 137.5(100) | 137.5(100) |
| S-SBR2a | pbw | | | |
| S-SBR2b | pbw | | | |
| S-SBR3 | pbw | | | |
| S-SBR4 | pbw | 27.5(20) | | |

TABLE 2-continued

| | | | | |
|---|---|---|---|---|
| S-SBR5 | pbw | | | |
| Carbon black 1 | pbw | 120 | 70 | 160 |
| Terpene resin 1 | pbw | 20 | 20 | 20 |
| Oil | pbw | 60 | 60 | 60 |
| Cyclic polysulfide 1 | pbw | | | |
| Cyclic polysulfide 2 | pbw | | | |
| Stearic acid | pbw | 2.0 | 2.0 | 2.0 |
| Zinc oxide | pbw | 3.0 | 3.0 | 3.0 |
| Sulfur | pbw | 2.0 | 2.0 | 2.0 |
| Vulcanization accelerator | pbw | 3.0 | 3.0 | 3.0 |
| Rubber hardness (100° C.) | Index value | 108 | 90 | 125 |
| tanδ (20° C.) | Index value | 110 | 89 | 130 |
| 300% Mod (100° C.) | Index value | 105 | 95 | 135 |
| Fracture strength (100° C.) | Index value | 98 | 105 | 95 |

The types of raw materials used in Tables 1 and 2 are shown below.

S-SBR1: Solution-polymerized styrene-butadiene rubber; styrene quantity of 36% by weight; vinyl quantity of 64% by weight; Mw of 1,470,000; Tg of −13° C.; oil extended product comprising 37.5 parts by weight of oil per 100 parts by weight of the rubber component; Tafuden E680 (manufactured by Asahi Kasei Chemicals Corporation)

S-SBR2a: Solution-polymerized styrene-butadiene rubber; styrene quantity of 37% by weight; vinyl quantity of 42% by weight; Mw of 1,260,000; Tg of −27° C.; oil extended product comprising 37.5 parts by weight of oil per 100 parts by weight of the rubber component; Tafuden E581 (manufactured by Asahi Kasei Chemicals Corporation)

S-SBR2b: Solution-polymerized styrene-butadiene rubber; styrene quantity of 41% by weight; vinyl quantity of 25% by weight; Mw of 1,010,000; Tg of −30° C.; oil extended product comprising 37.5 parts by weight of oil per 100 parts by weight of the rubber component; SLR6430 (manufactured by Dow Chemical)

S-SBR3: Solution-polymerized styrene-butadiene rubber; styrene quantity of 27% by weight; vinyl quantity of 69% by weight; Mw of 780,000; Tg of −18° C.; oil extended product comprising 37.5 parts by weight of oil per 100 parts by weight of the rubber component; NS460 (manufactured by Nihon Zeon Corporation)

S-SBR4: Solution-polymerized styrene-butadiene rubber; styrene quantity of 47% by weight; vinyl quantity of 52% by weight; Mw of 660,000; Tg of −6° C.; oil extended product comprising 37.5 parts by weight of oil per 100 parts by weight of the rubber component; NS462 (manufactured by Nihon Zeon Corporation)

S-SBR5: Solution-polymerized styrene-butadiene rubber; styrene quantity of 23% by weight; vinyl quantity of 70% by weight; Mw of 420,000; Tg of −24° C.; non-oil extended product; NS116 (manufactured by Nihon Zeon Corporation)

S-SBR6: Solution-polymerized styrene-butadiene rubber; styrene quantity of 41% by weight; vinyl quantity of 41% by weight; Mw of 1,160,000; Tg of −19° C.; oil extended product comprising 37.5 parts by weight of oil per 100 parts by weight of the rubber component; HP755B (manufactured by JSR Corporation)

Carbon black 1: $N_2SA$ of 340 m$^2$/g; CD2019 (manufactured by Columbia Carbon Corporation)

Carbon black 2: $N_2SA$ of 225 m$^2$/g; Toka Black #5500 (manufactured by Tokai Carbon Co., Ltd.)

Carbon black 3: $N_2SA$=142 m$^2$/g; Seast 9 (manufactured by Tokai Carbon Co., Ltd.)

Terpene resin 1: Aromatic modified terpene resin with softening point of 125° C.; YS Resin TO-125 (manufactured by Yasuhara Chemical Co., Ltd.)

Terpene resin 2: Aromatic modified terpene resin with softening point of 85° C.; YS Resin TO-85 (manufactured by Yasuhara Chemical Co., Ltd.)

Oil: Extract No. 4S (manufactured by Showa Shell Sekiyu K.K.)

Cyclic polysulfide 1: Cyclic polysulfide; in the above formula (I), $R=(CH_2)_2O(CH_2)_2$; X (average) is 4; n is from 2 to 3; prepared as described below:

1.98 g (0.02 mol) of 1,2-dichloroethane and 1197 g (2 mol) of 30% sodium polysulfide ($Na_2S_4$) aqueous solution were added to toluene (500 g), and then 0.64 g (0.1 mol) of tetrabutylammonium bromide was added, and reacted for 2 hours at 50° C. Subsequently, the reaction temperature was raised to 90° C., and a solution obtained by dissolving 311 g (1.8 mol) of dichloroethyl formal in 300 g of toluene was added drop-wise over the course of 1 hour, and then reacted for another 5 hours. After the reaction, the organic layer was separated and condensed under reduced pressure at 90° C., and 405 g of the above cyclic polysulfide was obtained (yield: 96.9%).

Cyclic polysulfide 2: Cyclic polysulfide; in the above formula (I), $R=(CH_2)_6$; X (average) is 4; n is from 1 to 4; prepared as described below.

8 g (0.102 mol) of sodium sulfide anhydride, 9.8 g (0.306 mol) of sulfur, and 50 g of tetrahydrofuran (THF) were put in a three-necked flask equipped with a condenser and thermometer, and reacted for 1 hour at 80° C., in a nitrogen atmosphere, and to this, 20 g of a THF solution containing 15.5 g (0.10 mol) of 1,6-dichlorohexane was added drop-wise over the course of 2 hours at 80° C., and this was further reacted for 2 hours at the same temperature. After the reaction ended, the salt of the organic phase was filtered out, and by condensing the organic phase under reduced pressure at 90° C., 20.2 g of cyclic polysulfide 2 having the constitution described above was obtained (yield: 95%).

Stearic acid: Beads Stearic Acid YR (manufactured by NOF Corp.)

Zinc oxide: Zinc Oxide #3 (manufactured by Seido Chemical Industry Co., Ltd.)

Sulfur: Oil-treated sulfur powder; Golden Flower (manufactured by Tsurumi Chemical Industry Co., Ltd.)

Vulcanization Accelerator: Vulcanization accelerator CBS; Nocceler CZ-G (manufactured by Ouchi Shinko Chemical Industrial Co., Ltd.)

As is clear from Tables 1 and 2, it was ascertained that the rubber compositions for use in tire treads of Working Examples 1 to 9 have high rubber hardness, 300% modulus and rubber strength in the high-temperature state, and can maintain dry grip performance (tan δ at 20° C.) for a longer time.

As is clear from Table 1, with the rubber composition of Comparative Example 2, rubber hardness (100° C.), 300% modulus and tensile fracture strength (100° C.) are negatively affected because the styrene quantity of 5-SBR4 exceeds 38% by weight, the vinyl quantity is less than 60% by weight, and Mw is less than 1,000,000. With the rubber composition of Comparative Example 3, tan δ at 20° C., 300% modulus and tensile fracture strength (100° C.) are negatively affected because S-SBR1 of the present technology is not compounded and only S-SBR2a is compounded. With the rubber composition of Comparative Example 4, tan δ at 20° C., 300% modulus and tensile fracture strength (100° C.) are negatively affected because the styrene quantity of S-SBR6 exceeds 38% by weight and the vinyl quantity is less than 60% by weight. With the rubber composition of Comparative Example 5, rubber hardness (100° C.) and tan δ at 20° C. are negatively affected because $N_2SA$ of carbon black 3 is less than 200 m²/g.

As is clear from Table 2, with the rubber composition of Comparative Example 6, dry grip performance (tan δ at 20° C.) is negatively affected because the compounded quantity of S-SBR1 is less than 60% by weight. With the rubber composition of Comparative Example 7, rubber hardness (100° C.), 300% modulus and tensile fracture strength (100° C.) are negatively affected because the S-SBR2 of the present technology is not compounded and Mw of S-SBR5 is less than 1,000,000. With the rubber composition of Comparative Examples 8 and 9, tensile fracture strength (100° C.) is negatively affected in both cases because the S-SBR2 of the present technology is not compounded, Mw of S-SBR3 and S-SBR4 are each less than 1,000,000, and Tg is higher than −20° C. With the rubber composition of Comparative Example 10, rubber hardness (100° C.), tan δ at 20° C. and 300% modulus are negatively affected because the compounded quantity of carbon black 1 is less than 80 parts by weight. With the rubber composition of Comparative Example 11, tensile fracture strength (100° C.) is negatively affected because the compounded quantity of carbon black 1 exceeds 150 parts by weight.

What is claimed is:

1. A rubber composition for use in tire treads, comprising from 80 to 150 parts by weight of carbon black having a nitrogen adsorption specific surface area of from 200 to 400 m²/g being compounded per 100 parts by weight of styrene-butadiene rubber including from 60% to 100% by weight of solution-polymerized styrene-butadiene rubber S-SBR1 and from 40% to 0% by weight of solution-polymerized styrene-butadiene rubber S-SBR2 so as to result in a total of 100% by weight, a styrene quantity of the S-SBR1 being from 30% to 38% by weight, a vinyl quantity of the S-SBR1 being from 62% to 80% by weight, a glass transition temperature of the S-SBR1 being from −20° C. to −5° C., a weight-average molecular weight of the S-SBR1 being from 1,000,000 to 1,800,000, a glass transition temperature of the S-SBR2 being not less than −30° C. and less than −20° C., and a weight-average molecular weight of the S-SBR2 being from 1,000,000 to 1,800,000.

2. The rubber composition for use in tire treads according to claim 1, wherein the content of S-SBR1 in 100% by weight of the styrene-butadiene rubber is from 70% to 100% by weight.

3. The rubber composition for use in tire treads according to claim 1, wherein the styrene quantity of the S-SBR1 is from 32% to 37% by weight.

4. The rubber composition for use in tire treads according to claim 1, wherein the vinyl quantity of the S-SBR1 is from 62% to 70% by weight.

5. The rubber composition for use in tire treads according to claim 1, wherein the glass transition temperature of the S-SBR1 is from −18° C. to −7° C.

6. The rubber composition for use in tire treads according to claim 1, wherein the weight-average molecular weight of the S-SBR1 is from 1,200,000 to 1,600,000.

7. The rubber composition for use in tire treads according to claim 1, wherein the content of S-SBR2 in 100% by weight of the styrene-butadiene rubber is from 30% to 0% by weight.

8. The rubber composition for use in tire treads according to claim 1, wherein the glass transition temperature of the S-SBR2 is not less than −28° C. and less than −22° C.

9. The rubber composition for use in tire treads according to claim 1, wherein the weight-average molecular weight of the S-SBR2 being from 1,100,000 to 1,500,000.

10. The rubber composition for use in tire treads according to claim 1, wherein from 10 to 50 parts by weight of aromatic modified terpene resin is compounded per 100 parts by weight of the styrene-butadiene rubber.

11. The rubber composition for use in tire treads according to claim 10, wherein from 0.2 to 5 parts by weight of a cyclic polysulfide expressed by formula (I) below is compounded per 100 parts by weight of the styrene-butadiene rubber:

Formula 1

wherein R is a substituted or unsubstituted alkylene group having from 4 to 8 carbons, or a substituted or unsubstituted oxyalkylene group having from 4 to 8 carbons; x is a number averaging from 3 to 5; and n is an integer from 1 to 5.

12. The rubber composition for use in tire treads according to claim 1, wherein from 20 to 45 parts by weight of aromatic modified terpene resin is compounded per 100 parts by weight of the styrene-butadiene rubber.

13. The rubber composition for use in tire treads according to claim 12, wherein the aromatic modified terpene resin comprises a styrene modified terpene resin having a softening point of from 70° C. to 160° C.

14. The rubber composition for use in tire treads according to claim 1, wherein from 0.2 to 5 parts by weight of a cyclic polysulfide expressed by formula (I) below is compounded per 100 parts by weight of the styrene-butadiene rubber:

Formula 1

wherein R is a substituted or unsubstituted alkylene group having from 4 to 8 carbons, or a substituted or unsubstituted oxyalkylene group having from 4 to 8 carbons; and x is a number averaging from 3 to 5; and n is an integer from 1 to 5.

15. The rubber composition for use in tire treads according to claim 1, comprising from 90 to 140 parts by weight of the carbon black having a nitrogen adsorption specific surface area of from 250 to 390 m$^2$/g.

16. The rubber composition for use in tire treads according to claim 1, further comprising a filler selected from one or more of the group consisting of:

silica, clay, mica, talc, calcium carbonate, aluminum hydroxide, aluminum oxide, and titanium oxide.

17. A pneumatic tire, comprising the rubber composition for use in tire treads described in claim 1.

18. A pneumatic tire, comprising the rubber composition for use in tire treads described in claim 10.

19. A pneumatic tire, comprising the rubber composition for use in tire treads described in claim 14.

20. A pneumatic tire, comprising the rubber composition for use in tire treads described in claim 11.

\* \* \* \* \*